US011698249B2

(12) United States Patent
Tan et al.

(10) Patent No.: US 11,698,249 B2
(45) Date of Patent: Jul. 11, 2023

(54) HIGH-STABILITY NANO-RADIAN-ORDER ANGLE MEASURING METHOD AND DEVICE BASED ON DRIFT VALUE FEEDBACK

(71) Applicant: Harbin Institute of Technology, Harbin (CN)

(72) Inventors: Jiubin Tan, Harbin (CN); Jian Shi, Harbin (CN); Yang Yu, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 63 days.

(21) Appl. No.: 17/477,624

(22) Filed: Sep. 17, 2021

(65) Prior Publication Data
US 2023/0033342 A1 Feb. 2, 2023

(30) Foreign Application Priority Data

Jul. 30, 2021 (CN) .......................... 202110874198.6

(51) Int. Cl.
*G01B 11/26* (2006.01)
*G02B 27/14* (2006.01)
*G02B 27/30* (2006.01)

(52) U.S. Cl.
CPC .............. *G01B 11/26* (2013.01); *G02B 27/14* (2013.01); *G02B 27/30* (2013.01)

(58) Field of Classification Search
CPC ......... G01B 11/26; G02B 27/14; G02B 27/30
See application file for complete search history.

(56) References Cited

U.S. PATENT DOCUMENTS

2007/0280058 A1* 12/2007 Kawasaki ................ G11B 7/22
369/44.14
2012/0021525 A1* 1/2012 Fehr ...................... G01N 21/648
250/226
(Continued)

FOREIGN PATENT DOCUMENTS

CN 101384945 A * 3/2009 ................ G01J 3/02
CN 204240960 U * 4/2015
(Continued)

*Primary Examiner* — Tarifur R Chowdhury
*Assistant Examiner* — Carlos Perez-Guzman
(74) *Attorney, Agent, or Firm* — IPro, PLLC

(57) ABSTRACT

Disclosed is a high-stability nano-radian-order angle measuring method and device based on drift value feedback, belonging to the technical field of precision measurement and the field of optical engineering. The device consists of LED light sources, convex lenses, multi-slit diaphragms, beam splitters, deflecting mirrors, steering mirrors, a collimator objective set, linear array CCDs, a four-quadrant position detector and a plane mirror. The method includes: enabling two paths of measuring light beams to carry angle change information of a measured object, respectively forming respective images on two sensors, and calculating a pitch angle and a yaw angle of the measured object relative to an optical axis by using positions of the two images so as to achieve the detection capability on the angle change of the measured object. While a focal distance of the objective is greatly improved by using the collimator objective set, the linear array CCDs are used as sensors to improve a measuring range. Therefore, the technical advantage of nano-radian-order angle limit resolution is achieved under the condition of the same measuring range. The LED light sources, the convex lenses and the multi-slit diaphragms are used, and at the same time, drift value feedback is performed by using the four-quadrant position detector and the steering mirrors, and the system stability is improved to 10 nano- (Continued)

radian order, thus solving the problem of limitation of light beam drift value to limit resolution of an autocollimator. Additionally, a system device designed by the present disclosure has the technical advantages of small structure size, high measurement precision and high measurement frequency response.

8 Claims, 4 Drawing Sheets

(56) References Cited

U.S. PATENT DOCUMENTS

2016/0187222 A1* 6/2016 Oya ................... G01M 11/0221
356/127
2017/0281102 A1* 10/2017 Ken .......................... G04F 5/14

FOREIGN PATENT DOCUMENTS

| | | | | |
|---|---|---|---|---|
| CN | 109579780 A | * | 4/2019 | ............... G01C 1/00 |
| CN | 113848540 A | * | 12/2021 | |
| DE | 102018124129 A1 | * | 6/2019 | ............. G02B 21/00 |

* cited by examiner

HIGH-STABILITY NANO-RADIAN-ORDER ANGLE MEASURING METHOD AND DEVICE BASED ON DRIFT VALUE FEEDBACK

TECHNICAL FIELD

The present disclosure belongs to the technical field of precision measurement, and particularly relates to a high-stability nano-radian-order angle measuring method and device based on drift value feedback.

BACKGROUND

In the technical field of precision measurement, the field of optical engineering, the field of frontier science experiments and the field of high-end precision equipment manufacturing, an auto-collimation angle measurement technology with high resolution, high precision and high stability in a wide working range is urgently needed, and it supports the development of technologies and instrument apparatuses in the above fields.

In the field of precision measurement technology and instrument, an autocollimator is combined with a circular grating, so that any line angle can be measured. The auto-collimation technology is combined with a polyhedral prism, so that surface angle measurement and circular division measurement can be performed. A maximum working distance is from several meters to hundreds of meters, and the resolution is from 0.1 to 0.01 arc-second.

In the field of optical engineering and the field of frontier science experiments, the autocollimator is combined with two two-dimensional circular gratings which are perpendicular to each other, so that the space angle measurement can be performed. A position reference is formed by two paths of autocollimators, and the included angle or parallelism of two optical axes can be measured. An angle working range is from tens of arc-seconds to tens of arc-minutes.

In the field of frontier science experiment devices and high-end precision equipment manufacturing, by using the autocollimator, the angular rotation precision of the rotary motion reference of the frontier science experiment devices and high-end precision equipment can be measured, and the space line precision of the linear motion reference and the parallelism and perpendicularity of the pairwise motion references can be measured.

The auto-collimation technology has the advantages of non-contact, high measurement precision, use convenience, etc., and has a wide application in the above fields.

A traditional autocollimator is as shown in FIG. 1, and includes a laser light source 1, a first convex lens 41, a first beam splitter 2 and an image sensor 3. A light beam emitted by the laser light source 1 is collimated into parallel light beams through the convex lens 41, and then, the parallel light beams are incident upon a reflecting surface of a measured object 5. Light beams reflected from the reflecting surface of the measured object 5 are acquired by the image sensor 3 for imaging. According to this structure, a focal length of a collimation lens of the autocollimator is generally 500 mm, but limit displacement resolution of a common sensor is between 30 nm and 50 nm, and an effective measuring area is generally 5×5 mm². At the same time, due to a great drift value of a laser light source, the limit resolution of the measurement is seriously influenced by the measurement instability. Due to the limitation of these conditions, the device is difficult to break through the resolution bottleneck of 0.003 arc-second (10 nano-radian order) in a measuring range of 300 arc-seconds when measuring the space angle information of the measured object.

Based on the above, the system has the following two problems:

Firstly, because of the contradiction between the limit angle resolution of the autocollimator and the measuring range, the nano-radian-order high angle resolution cannot be achieved in the traditional measuring range. If the focal length of an objective of the autocollimator is increased, the limit angle resolution of the autocollimator is improved, but the measuring range may be proportionally reduced. If the effective measurement area of the sensor is increased, the decrease of the limit displacement resolution may also cause the decrease of the limit angle resolution of the autocollimator. Therefore, the traditional technology is difficult to achieve the high angle resolution of 0.001 arc-second (nano-radian order) in the measuring range of 300 arc-seconds.

Secondly, due to a light beam drift value of the laser light source of the traditional auto-collimation technology, the stability of the autocollimator is seriously influenced by the angle drift value and the displacement drift value of light beams of the laser light source, and the limit resolution of the autocollimator is further limited. After the laser light source is collimated by the convex lens, due to the existence of its drift value, the collimation precision can only reach $10^{-7}$ radian order (hundred nano-radian order). The improvement of the limit resolution of the autocollimator is seriously limited by the noise caused by light source instability of the laser light source.

Therefore, the traditional auto-collimation technology does not have high measurement stability, and cannot achieve the nano-radian-order high angle resolution in the traditional measuring range.

SUMMARY

By aiming at the problems that a traditional auto-collimation angle measuring device cannot achieve nano-radian-order high angle resolution in a traditional measuring range and does not have high measurement stability, the present disclosure discloses a high-stability nano-radian-order angle measuring method and device based on drift value feedback.

According to the method, a four-quadrant position detector is used as a feedback detection module at a light source emitting end to perform real-time high-precision detection on the drift value of displacement drift and angle drift generated by light sources in the device; and steering mirrors are used as feedback execution modules to perform real-time closed loop feedback control according to the measured drift value, and light spots emitted from the light sources are always controlled in the center position of the four-quadrant position detector, so as to improve the stability of the light sources and reduce the drift value. It is shown through experiments that the drift values of displacement drift and angle drift of the light sources are controlled to the 10 nano-radian order in real time by the method, and the problem of limit resolution limitation of the autocollimator due to the drift value of the light beams is solved.

At the same time, according to the method, a multiplexing technology is realized through a collimator objective set, a multi-slit diaphragm, double paths of beam splitters and double paths of linear array CCDs, and the nano-radian-order angle resolution measurement is realized in a larger measuring range. It is shown through the experiments that the method can realize the angle resolution of one thousandth arc-second in a 300 arc-second measuring range, and the problem that the autocollimator cannot achieve the nano-radian-order high angle resolution in a traditional measuring range is solved.

Therefore, compared with a traditional auto-collimation measuring device, the device of the present disclosure has the technical advantages of nano-radian-order high angle resolution and high measurement stability under the condition of the same measuring range.

The objective of the present disclosure is achieved as follows:

A high-stability nano-radian-order angle measuring device based on drift value feedback includes a first LED light source, a second LED light source, a first convex lens, a fourth convex lens, a fifth convex lens, a first concave lens, a first multi-slit diaphragm, a second multi-slit diaphragm, a first beam splitter, a second beam splitter, a third beam splitter, a fourth beam splitter, a first deflecting mirror, a second deflecting mirror, a first linear array CCD, a second linear array CCD, a four-quadrant position detector and a plane mirror. Light emitted by the first LED light source and the second LED light source is respectively collimated by the fourth convex lens and the fifth convex lens and is then parallelly incident upon the first multi-slit diaphragm and the second multi-slit diaphragm; by taking the first multi-slit diaphragm and the second multi-slit diaphragm as object planes, two emitted light beams are gathered through the first beam splitter and are then split through the fourth beam splitter to be split into reflected light and transmitted light; the reflected light is perpendicularly incident upon the four-quadrant position detector; the transmitted light is reflected by the first deflecting mirror and the second deflecting mirror and is then perpendicularly incident upon the collimator objective set to be collimated into parallel light beams; the parallel light beams reflected by the plane mirror all return along an original path, and are split by the third beam splitter after being reflected by the second beam splitter, one path is incident upon the first linear array CCD to be acquired for imaging, and one path is incident upon the second linear array CCD to be acquired for imaging.

The first multi-slit diaphragm is a transmission type diaphragm consisting of three parallel linear slits with equidistance and equal width, and the first LED light source is irradiated on the first multi-slit diaphragm after being collimated by the second convex lens, so that the three parallel linear light spots with equidistance and equal width are one object of the device. A light beam emitted from the first LED light source is a first beam of measuring light of the device. The second multi-slit diaphragm has the same structure as the first multi-slit diaphragm, but the slit directions of the second multi-slit diaphragm and the first multi-slit diaphragm are perpendicular to each other, so that an object of the emitted second beam of measuring light is also three parallel linear light spots with equidistance and equal width, and is perpendicular to the light spots of the first beam of measuring light at the same time.

Or the first multi-slit diaphragm is a transmission type diaphragm consisting of four parallel linear slits with equidistance and equal width, and the first LED light source is irradiated on the first multi-slit diaphragm after being collimated by the second convex lens, so that the four parallel linear light spots with equidistance and equal width are one object of the device. A light beam emitted by the first LED light source is a first beam of measuring light of the device. The second multi-slit diaphragm has the same structure as the first multi-slit diaphragm, but the slit directions of the second multi-slit diaphragm and the first multi-slit diaphragm are perpendicular to each other, so that an object of the emitted second beam of measuring light is also four parallel linear light spots with equidistance and equal width, and is perpendicular to the light spots of the first beam of measuring light at the same time.

The first linear array CCD acquires the first beam of measuring light for imaging, a sensor measuring direction is perpendicular to the slit direction of the first multi-slit diaphragm. The second linear array CCD acquires the second beam of measuring light for imaging, and a sensor measuring direction is perpendicular to the slit direction of the second multi-slit diaphragm.

The four-quadrant position detector acquires a real-time drift value of the first beam of measuring light and the second beam of measuring light, and corrects measuring results to further improve the stability of the system device.

The collimator objective set consists of a first convex lens and a first concave lens, a telephoto objective set is formed, and a focal length of the telephoto objective set is much greater than that of the first convex lens, thus improving the limit angle resolution of an autocollimator.

The first deflecting mirror and the second deflecting mirror are placed parallelly, and a fixed small angle is existed between each of the first deflecting mirror and the second deflecting mirror and a primary optical axis, so that a long focal length optical path of the system device can be folded, and a space dimension of the system is reduced.

A high-stability nano-radian-order angle measuring method based on drift value feedback realized on the high-stability nano-radian-order angle measuring device based on drift value feedback includes the following steps:

step a: fixing the plane mirror to a surface of a measured object;

step b: switching on the first LED light source and the second LED light source, and adjusting positions of the measured object and the plane mirror to enable geometric centers of light spot images received by the first linear array CCD, the second linear array CCD and the four-quadrant position detector to be located in center positions of each sensor;

step c: adjusting installation directions of the first multi-slit diaphragm and the second multi-slit diaphragm so that directions of the light spot images received by the first linear array CCD and the second linear array CCD are respectively perpendicular to the installation directions of the sensors;

step d: controlling the first LED light source and the second LED light source to flicker alternately at a fixed frequency, at this moment, directly receiving, by the four-quadrant position detector, two beams of measuring light emitted by the first LED light source and the second LED light source, and respectively and alternately acquiring, by the first linear array CCD and the second linear array CCD, measuring light emitted by the first LED light source and the second LED light source;

step e: when the plane mirror rotates along with yaw angle and pitch angle generated by the measured object, outputting, by the first linear array CCD, a displacement value of light beam light spots generated by the first multi-slit diaphragm, where a distance from the light spot to the center position of an image sensor is S1, outputting, by the second linear array CCD, a displacement value of light beam light spots generated by the second multi-slit diaphragm, where a distance from the light spot to the center position of the image sensor is S2, and outputting, by the four-quadrant position detector, light spot displacement drift values E1 and E2 of the first LED light source and the second LED light source; and step f: solving α through calculation according to S1−E1=f·tan(2α) by using the displacement S1 of the light spot of the first linear array CCD and the displacement drift value E1 of the light spot of the four-quadrant position detector, where α is a value of a yaw angle generated by the measured object; and solving β according to S2−E2=f·tan (2β) by using the displacement S2 of the light spot of the second linear array CCD and the displacement drift value E2 of the light spot of the four-quadrant position detector, where β is a value of a pitch angle generated by the measured object.

Beneficial Effects:

1. By aiming at the problem that a traditional auto-collimation angle measuring device does not have high measurement stability, the present disclosure provides a high-stability nano-radian-order angle measuring method based on drift value feedback. According to the method, the four-quadrant position detector is used as a feedback detection module at a light source emitting end to perform real-time high-precision detection on the drift values of displacement drift and angle drift generated by the light sources in the device; and the steering mirrors are used as feedback execution modules to perform real-time closed loop feedback control according to the measured drift value, and light spots emitted from the light sources are always controlled in the center position of the four-quadrant position detector, so as to improve the stability of the light sources and reduce the drift value. The drift values of displacement drift and angle drift of the light source are finally controlled at the 10 nano-radian order, the problem of limit resolution limitation of the autocollimator due to the drift value of the light beams is solved. This is one of innovation points of the present disclosure different from the prior art.

2. Compared with a traditional measuring device, the device of the present disclosure replaces laser light sources by the LED light sources, so that the measurement instability caused by the drift value of the light sources is directly reduced. The light emitted by the LED light sources is collimated by the second convex lens and the third convex lens, at the same time, the first multi-slit diaphragm and the second multi-slit diaphragm modulate two paths of parallel light, and the first multi-slit diaphragm and the second multi-slit diaphragm are used as objects of the system device, so that the influence of displacement drift and angle drift is further reduced. This is a second innovation point of the present disclosure different from the prior art.

3. By aiming at the problems that the traditional auto-collimation angle measuring device cannot achieve nano-radian-order high angle resolution in a traditional measuring range, the method realizes the multiplexing technology by using the collimator objective set, the multi-slit diaphragms, the double paths of beam splitters and the double paths of linear array CCDs, and realizes the nano-radian-order angle resolution measurement in a larger measuring range. The method can realize the angle resolution of one thousandth arc-second in a 300 arc-second measuring range, the nano-radian-order high angle resolution is finally achieved by the system in the traditional measuring range, and the method breaks through the contradiction between the limit angle resolution of the autocollimator and the measuring range. This is a third innovation point of the present disclosure different from the prior art.

Moreover, the present disclosure further has the following technical advantages:

Firstly, the first deflecting mirror and the second deflecting mirror are selected to fold long focal length light paths of the system twice, so that the size of the system device is reduced, the device is more applicable to a field measurement environment, and at the same time, the influence of air fluctuations caused by oversize of the system device on the measuring results is avoided.

Secondly, the first multi-slit diaphragm and the second multi-slit diaphragm are selected to be used as objects of the angle measuring device, three stripe light spots on each of the linear array CCDs are positioned at the same time to improve the system measurement stability, and at the same time, the measuring precision of the angle measuring device is also improved.

Thirdly, in the present disclosure, two paths of one-dimensional linear array CCDs are used to replace two-dimensional image sensors, and the total quantity of pixels of each sensor is small, so that the requirement on the subsequent image processing technology is reduced, and the frequency response of the measuring device is improved.

In the figures, 1 denotes a laser light source, 2 denotes a first beam splitter, 3 denotes an image sensor, 4 denotes a collimator objective set, 41 denotes a first convex lens, 42 denotes a first concave lens, 43 denotes a second concave lens, 44 denotes a fourth convex lens, 45 denotes a fifth convex lens, 5 denotes a plane mirror, 6 denotes a first LED light source, 7 denotes a second convex lens, 8 denotes a first multi-slit diaphragm, 9 denotes a second LED light source, 10 denotes a third convex lens, 11 denotes a second multi-slit diaphragm, 12 denotes a second beam splitter, 13 denotes a first deflecting mirror, 14 denotes a second deflecting mirror, 15 denotes a third beam splitter, 16 denotes a first linear array CCD, 17 denotes a second linear array CCD, 18 denotes a fourth beam splitter, 19 denotes a four-quadrant position detector, 20 denotes a first steering mirror, and 21 denotes a second steering mirror.

DETAILED DESCRIPTION

Examples of the present disclosure are further illustrated in detail in conjunction with the accompanying drawings.

Example 1

The present example is an example of a high-stability nano-radian-order angle measuring device based on drift value feedback.

Figure 1:
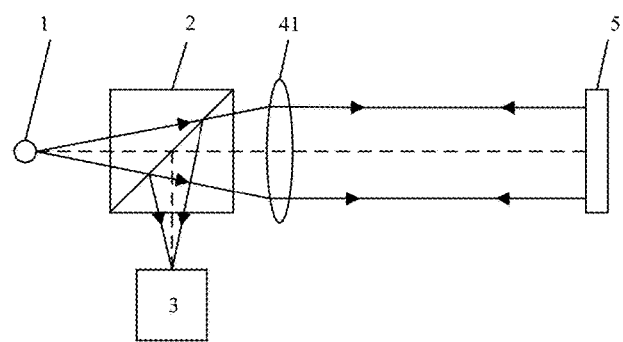
FIG. 1 is a schematic structural diagram of a traditional auto-collimation angle measuring device.
Figure 2:
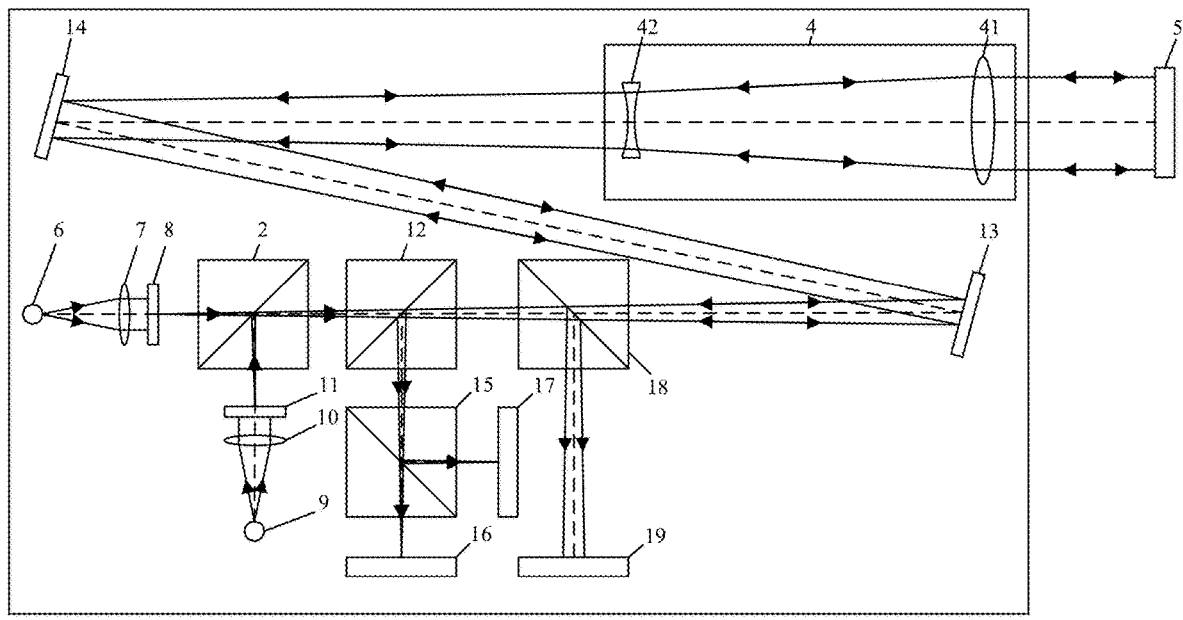
FIG. 2 is a schematic structural diagram of Example 1 of a high-stability nano-radian-order angle measuring device based on drift value feedback of the present disclosure.
Figure 3:
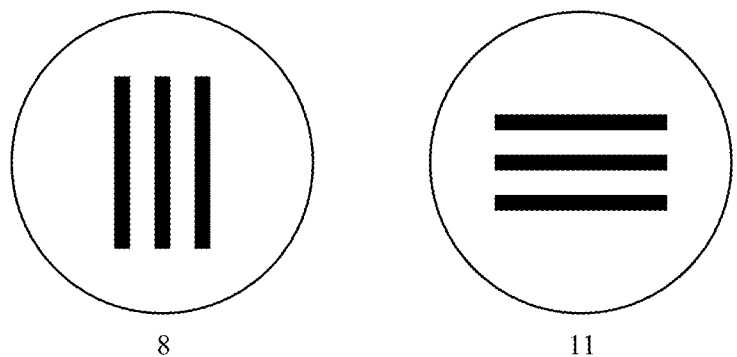
FIG. 3 is a schematic diagram of structures and installation directions of a first type of multi-slit diaphragms 8 and 11 in Example 1.
Figure 4:
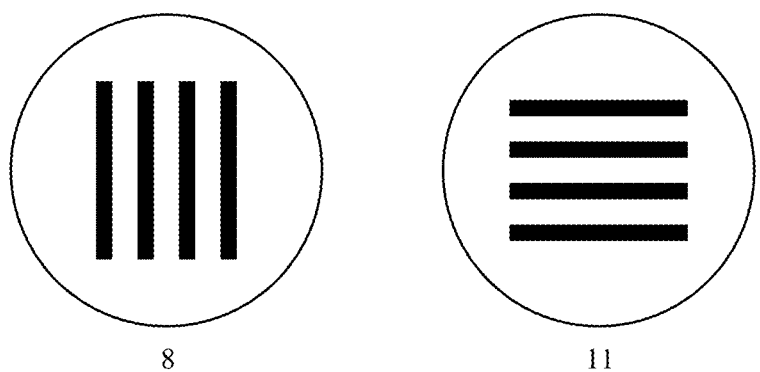
FIG. 4 is a schematic diagram of structures and installation directions of a second type of multi-slit diaphragms 8 and 11 in Example 1.
Figure 5:
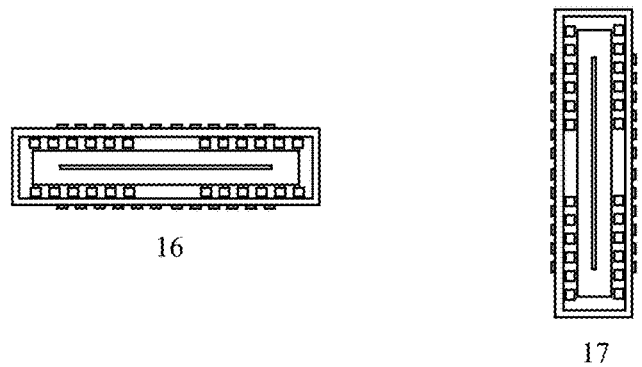
FIG. 5 is a schematic diagram of structures and installation directions of linear array CCDs 16 and 17 in Example 1.

A schematic structural diagram of the high-stability nano-radian-order angle measuring device based on drift value feedback of the present example is as shown in FIG. 2. The angle measuring device includes a first beam splitter 2, a collimator objective set 4 (a first convex lens 41 and a first concave lens 42), a plane mirror 5, a first LED light source 6, a second convex lens 7, a first multi-slit diaphragm 8, a second LED light source 9, a third convex lens 10, a second multi-slit diaphragm 11, a second beam splitter 12, a first deflecting mirror 13, a second deflecting mirror 14, a third beam splitter 15, a first linear array CCD 16, a second linear array CCD 17, a fourth beam splitter 18 and a four-quadrant position detector 19.

Light emitted by the first LED light source 6 and the second LED light source 9 are respectively collimated by the second convex lens 7 and the third convex lens 10 and is then parallelly incident upon the first multi-slit diaphragm 8 and the second multi-slit diaphragm 11. By taking the first multi-slit diaphragm 8 and the second multi-slit diaphragm 11 as object planes, two emitted light beams are gathered through the first beam splitter 2 and are then split through the fourth beam splitter 18 to be split into reflected light and transmitted light. The reflected light is perpendicularly incident upon the four-quadrant position detector 19. The transmitted light is reflected by the first deflecting mirror 13 and the second deflecting mirror 14 and is then perpendicularly incident upon the collimator objective set 4 to be collimated into parallel light beams. The parallel light beams reflected by the plane mirror all return along an original path, and are split by the third beam splitter 15 after being reflected by the second beam splitter 12, one path is incident upon the first linear array CCD 16 to be acquired for imaging, and one path is incident upon the second linear array CCD 17 to be acquired for imaging.

The first multi-slit diaphragm 8 is a transmission type diaphragm consisting of three parallel linear slits with equidistance and equal width. The first LED light source 6 is irradiated on the first multi-slit diaphragm 8 after being collimated by the second convex lens 7, so that the three parallel linear light spots with equidistance and equal width are one object of the device. A light beam emitted by the first LED light source is a first beam of measuring light of the device. The second multi-slit diaphragm 11 has the same structure as the first multi-slit diaphragm 8, but the slit of the second multi-slit diaphragm and the slit direction of the first multi-slit diaphragm 8 are perpendicular to each other, so that an object of the emitted second beam of measuring light is also three parallel linear light spots with equidistance and equal width, and is perpendicular to the light spots of the first beam of measuring light at the same time.

Or the first multi-slit diaphragm 8 is a transmission type diaphragm consisting of four parallel linear slits with equidistance and equal width. The first LED light source 6 is irradiated on the first multi-slit diaphragm 8 after being collimated by the second convex lens 7, so that the four parallel linear light spots with equidistance and equal width are one object of the device. A light beam emitted by the first LED light source is a first beam of measuring light of the device. The second multi-slit diaphragm 11 has the same structure as the first multi-slit diaphragm 8, but the slit of the second multi-slit diaphragm and the slit direction of the first multi-slit diaphragm 8 are perpendicular to each other, so that an object of the second beam of the emitted measuring light is also four parallel linear light spots with equidistance and equal width, and is perpendicular to the light spots of the first beam of measuring light beam.

The first linear array CCD 16 acquires the first beam of measuring light for imaging, a sensor measuring direction is perpendicular to the slit direction of the first multi-slit diaphragm 8. The second linear array CCD 17 acquires the second beam of measuring light for imaging, and a sensor measuring direction is perpendicular to the slit direction of the second multi-slit diaphragm 11.

After the four-quadrant position detector 19 is disposed at the fourth beam splitter 18, a real-time drift value of the first beam of measuring light and the second beam of measuring light is acquired.

The collimator objective set 4 consists of the first convex lens 41 and the first concave lens 42. The first linear array CCD 16 and the second linear array CCD 17 are disposed at a focal plane of the collimator objective set 4, and are conjugate with the first multi-slit diaphragm 8 and the second multi-slit diaphragm 11 in positions. When the plane mirror 5 is perpendicular to the optical axis, under the condition of no angle change, centers of light spots acquired by the first linear array CCD 16 and the second linear array CCD 17 are all in the geometric center positions of the sensors.

The first deflecting mirror 13 and the second deflecting mirror 14 are placed parallelly, and a fixed small angle is existed between each of the first deflecting mirror and the second deflecting mirror and a primary optical axis.

A measuring principle is as follows:

When the measured object generates an angle change of a yaw angle $\alpha$ and a pitch angle $\beta$, the plane mirror 5 also generates an angle change of the yaw angle $\alpha$ and the pitch angle $\beta$. For two measuring light beams incident upon the plane mirror 5, since the plane mirror 5 generates yaw angle and pitch angle rotation along with the measured object, the light beams reflected by the plane mirror 5 generate deflection of a $2\alpha$ and a $2\beta$ angle relative to the original light beams.

The first LED light source 6 and the second LED light source 9 are controlled to alternately flicker at a fixed frequency, and at this moment, the first linear array CCD 16 and the second linear array CCD 17 respectively and alternately acquire measuring light emitted by the first LED light source 6 and the second LED light source 9. Being the same as the measuring principle of the traditional autocollimator, the two paths of measuring light beams are respectively gathered onto the first linear array CCD 16 and the second linear array CCD 17, and the light beam light spots and the center positions of the linear array CCD sensors respectively generate displacements S1 and S2.

The four-quadrant position detector 19 measures the drift values of the first LED light source 6 and the second LED light source 9 in real time, and the light beam light spots and the center position of the four-quadrant position detector 19 respectively generate displacement drift values E1 and E2.

Additionally, the following relationships are satisfied: $S1-E1=f\cdot\tan(2\alpha)$, and $S2-E2=f\cdot\tan(2\beta)$. f is a focal length of the collimator objective set 4.

Therefore, the angle change of the yaw angle α and the pitch angle β generated by the measured object can be calculated according to the displacements S1 and S2 of the light spots on the first linear array CCD 16 and the second linear array CCD 17 and the center positions of the sensors and the displacement drift values E1 and E2 of the light spots on the four-quadrant position detector 19 and the center positions of the sensors.

The present example is an example of a high-stability nano-radian-order angle measuring method based on drift value feedback, including the following steps:

Step a: a plane mirror 5 is fixed to a surface of a measured object.

Step b: a first LED light source 6 and a second LED light source 9 are switched on, and positions of the measured object and the plane mirror 5 are adjusted to enable geometric centers of light spot images received by a first linear array CCD 16 and a second linear array CCD 17 to be located in center positions of two sensors.

Step c: installation directions of a first multi-slit diaphragm 8 and a second multi-slit diaphragm 11 are adjusted so that directions of the light spot images received by the first linear array CCD 16 and the second linear array CCD 17 are respectively perpendicular to the installation directions of the sensors.

Step d: the first LED light source 6 and the second LED light source 9 are controlled to flicker alternately at a fixed frequency, at this moment, a four-quadrant position detector 19 directly receives two beams of measuring light emitted by the first LED light source 6 and the second LED light source 9. The first linear array CCD 16 and the second linear array CCD 17 respectively and alternately acquire measuring light emitted by the first LED light source 6 and the second LED light source 9.

Step e: when the plane mirror 5 rotates along with yaw angle and pitch angle generated by the measured object, the first linear array CCD 16 outputs a displacement value of light beam light spots generated by the first multi-slit diaphragm 8, a distance from the light spot to the center position of an image sensor is S1. The second linear array CCD 17 outputs a displacement value of light beam light spots generated by the second multi-slit diaphragm 11, a distance from the light spot to the center position of the image sensor is S2, and the four-quadrant position detector 19 outputs light spot displacement drift values E1 and E2 of the first LED light source 6 and the second LED light source 9.

Step f: α is solved through calculation according to $S1-E1=f\cdot\tan(2\alpha)$ by using the displacement S1 of the light spot of the first linear array CCD 16 and the displacement drift value E1 of the light spot of the four-quadrant position detector 19, and α is a value of a yaw angle generated by the measured object. β is solved according to $S2-E2=f\cdot\tan(2\beta)$ by using the displacement S2 of the light spot of the second linear array CCD 17 and the displacement drift value E2 of the light spot of the four-quadrant position detector 19, and β is a value of a pitch angle generated by the measured object.

The present disclosure has an innovation point that the first LED light source 6 and the second LED light source 9 are used as light sources of the system device, and the measurement instability caused by the light source drift value is directly reduced. The light emitted by the LED light sources are collimated by the second convex lens 7 and the third convex lens 10. At the same time, the first multi-slit diaphragm 8 and the second multi-slit diaphragm 11 modulate the two paths of parallel light, and the first multi-slit diaphragm 8 and the second multi-slit diaphragm 11 are used as objects of the system device, so that the influence of angle drift and displacement drift is further reduced. At the same time, the four-quadrant position detector 19 is used as a feedback detection module to perform real-time high-precision detection on the drift value of displacement drift and angle drift generated by the light sources in the device. The first steering mirror 20 and the second steering mirror 21 are used as feedback execution modules to perform real-time closed loop feedback control according to the measured drift value, and light spots emitted from the light sources are always controlled in the center position of the four-quadrant position detector 19, so as to control the drift values of displacement drift and angle drift of the light sources to the 10 nano-radian order in real time, and the problem of limit resolution limitation of the autocollimator due to the drift value of the light beams is solved.

The present disclosure forms the collimator objective set 4 by the first convex lens 41 and the first concave lens 42. Additionally, the first linear array CCD 16 and the second linear array CCD 17 are used as sensors of the system device. In this kind of structure, the collimator objective set expands the focal length of the angle measuring device to 3 to 4 times, and the limit angle resolution of the whole system is improved to the nano-radian order. The two one-dimensional linear CCD sensors improves the measuring range by 3 to 4 times while the limit displacement resolution of a sensor end is not reduced, so that the problem of measuring range reduction caused by focal length expansion is solved. The nano-radian-order high angle resolution is finally achieved by the system in the traditional measuring range, and the method breaks through the contradiction between the limit angle resolution of the autocollimator and the measuring range.

Therefore, compared with a traditional auto-collimation angle measuring device, the device of the present disclosure has the technical advantages that under the condition of the same measuring range, the angle limit resolution reaches the nano-radian order, and the measurement stability is high.

Example 2

The present example is an example of a high-stability nano-radian-order angle measuring device based on drift value feedback.

Figure 6:
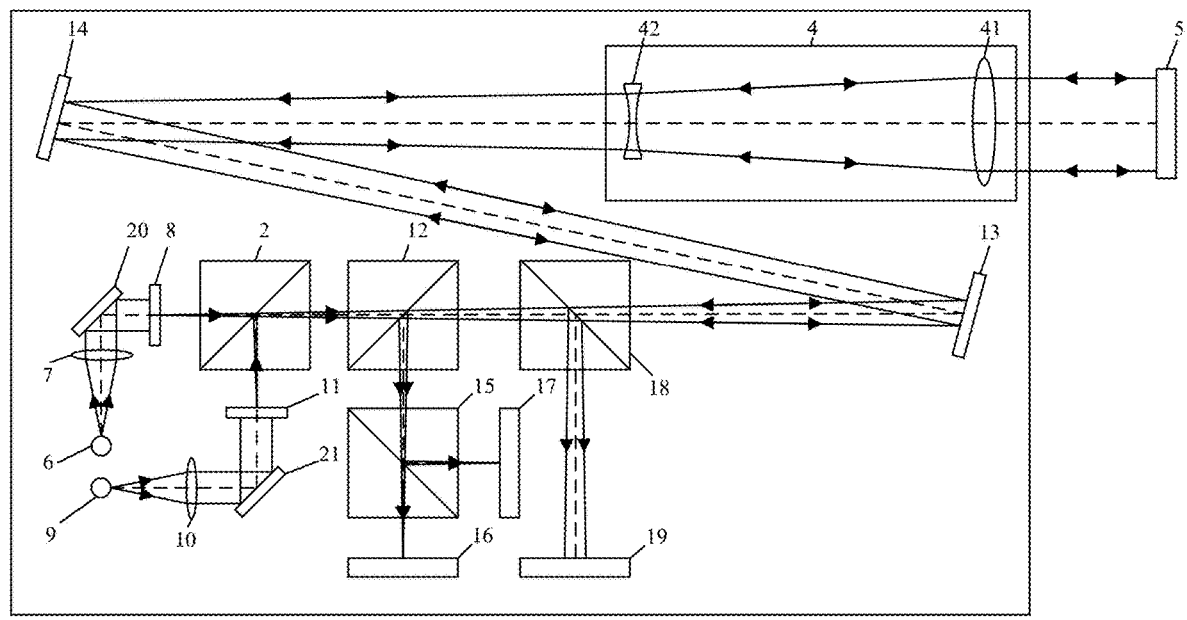
FIG. 6 is a schematic structural diagram of Example 2 of a high-stability nano-radian-order angle measuring device based on drift value feedback of the present disclosure.

A schematic structural diagram of the high-stability nano-radian-order angle measuring device based on drift value feedback of the present example is as shown in FIG. 6. On the basis of Example 1, according to the present example, a first steering mirror 20 is added between the second convex lens 7 and the first multi-slit diaphragm 8, a second steering mirror 21 is added between the third convex lens 10 and the second multi-slit diaphragm 11 to be used as feedback execution module, as shown in FIG. 6.

The present example is an example of a high-stability nano-radian-order angle measuring method based on drift value feedback, including the following steps:

Step a: a plane mirror 5 is fixed to a surface of a measured object.

Step b: a first LED light source 6 and a second LED light source 9 are switched on, and positions of the measured object and the plane mirror 5 are adjusted to enable geometric centers of light spot images received by a first linear array CCD 16, a second linear array CCD 17 and a four-quadrant position detector 19 to be located in center positions of each sensor.

Step c: installation directions of a first multi-slit diaphragm 8 and a second multi-slit diaphragm 11 are adjusted so that directions of the light spot images received by the first linear array CCD 16 and the second linear array CCD 17 are respectively perpendicular to the installation directions of the sensors.

Step d: the first LED light source 6 and the second LED light source 9 are controlled to flicker alternately at a fixed frequency, at this moment, the four-quadrant position detector 19 directly receives two beams of measuring light emitted by the first LED light source 6 and the second LED light source 9. The first linear array CCD 16 and the second linear array CCD 17 respectively and alternately acquire measuring light reflected after being emitted by the first LED light source 6 and the second LED light source 9.

Step e: when the four-quadrant position detector 19 outputs the light spot displacement drift values E1 and E2 of the first LED light source 6 and the second LED light source 9, the first steering mirror 20 generates an angle change to adjust the light beam direction of the first LED light source 6 so that the light spot displacement drift value E1 is always 0, and the second steering mirror 21 generates an angle change to adjust the light beam direction of the second LED light source 9 so that the light spot displacement drift value E2 is always 0.

Step f: when the plane mirror 5 rotates along with yaw angle and pitch angle generated by the measured object, the first linear array CCD 16 outputs a displacement value of light beam light spots generated by the first multi-slit diaphragm 8, a distance from the light spot to the center position of an image sensor is S1. The second linear array CCD 17 outputs a displacement value of light beam light spots generated by the second multi-slit diaphragm 11, and a distance from the light spot to the center position of the image sensor is S2.

Step g: $\alpha$ is solved through calculation according to $S1=f\cdot\tan(2\alpha)$ by using the displacement S1 of the light spot of the first linear array CCD 16, and $\alpha$ is a value of a yaw angle generated by the measured object. $\beta$ is solved according to $S2=f\cdot\tan(2\beta)$ by using the displacement S2 of the light spot of the second linear array CCD 17, and $\beta$ is a value of a pitch angle generated by the measured object.

The present disclosure has an innovation point that the fourth beam splitter 18 and the four-quadrant position detector 19 are used as feedback detection modules, the first steering mirror 20 and the second steering mirror 21 are added as feedback execution modules, the drift values of the light beams of the two LED light sources are measured in real time, and the reflector mirrors are in closed loop control to perform real-time compensation on the light source drift values, so that the problem of measurement instability caused by light source drift values is solved.

Example 3

The present example is an example of a high-stability nano-radian-order angle measuring device based on drift value feedback.

Figure 7:
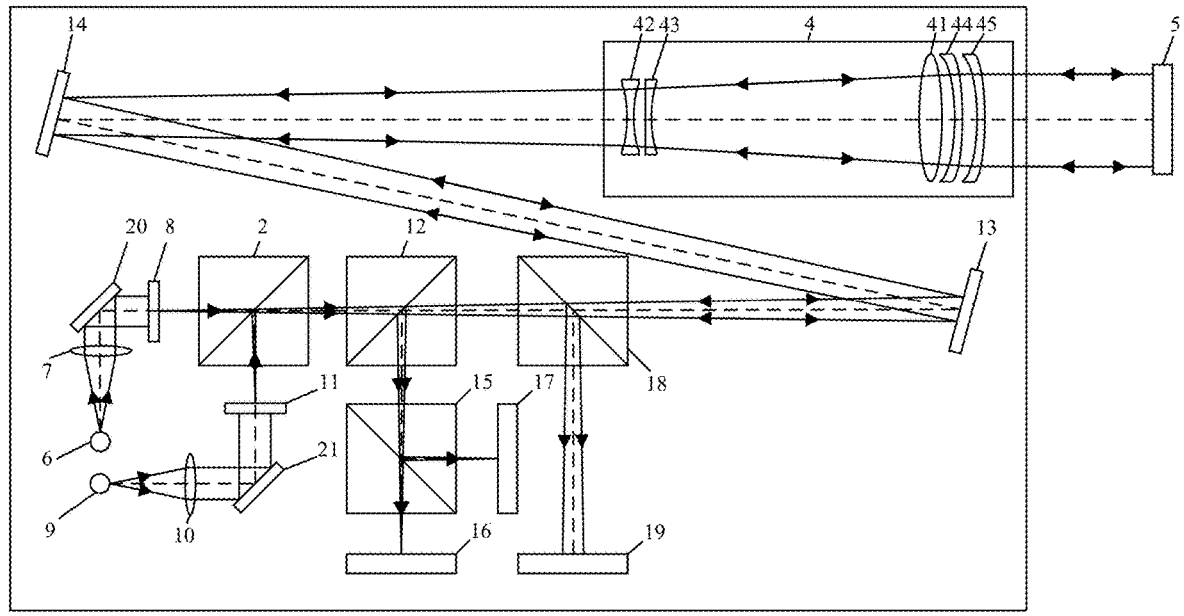
FIG. 7 is a schematic structural diagram of Example 3 of a high-stability nano-radian-order angle measuring device based on drift value feedback of the present disclosure.

A schematic structural diagram of the high-stability nano-radian-order angle measuring device based on drift value feedback of the present example is as shown in FIG. 7. On the basis of Example 1, according to the present example, a first steering mirror 20 is added between the second convex lens 7 and the first multi-slit diaphragm 8, and a second steering mirror 21 is added between the third convex lens 10 and the second multi-slit diaphragm 11 to be used as feedback execution module. A second concave lens 43, a fourth convex lens 44 and a fifth convex lens 45 are added to the collimator objective set 4, as shown in FIG. 7.

The present example is an example of a high-stability nano-radian-order angle measuring method based on drift value feedback, including the following steps:

Step a: a plane mirror 5 is fixed to a surface of a measured object.

Step b: a first LED light source 6 and a second LED light source 9 are switched on, and positions of the measured object and the plane mirror 5 are adjusted to enable geometric centers of light spot images received by a first linear array CCD 16, a second linear array CCD 17 and a four-quadrant position detector 19 to be located in center positions of each sensor.

Step c: installation directions of a first multi-slit diaphragm 8 and a second multi-slit diaphragm 11 are adjusted so that directions of the light spot images received by the first linear array CCD 16 and the second linear array CCD 17 are respectively perpendicular to the installation directions of the sensors.

Step d: the first LED light source 6 and the second LED light source 9 are controlled to flicker alternately at a fixed frequency, at this moment, the four-quadrant position detector 19 directly receives two beams of measuring light emitted by the first LED light source 6 and the second LED light source 9. The first linear array CCD 16 and the second linear array CCD 17 respectively and alternately acquire measuring light reflected after being emitted by the first LED light source 6 and the second LED light source 9.

Step e: when the four-quadrant position detector 19 outputs the light spot displacement drift values E1 and E2 of the first LED light source 6 and the second LED light source 9, the first steering mirror 20 generates an angle change to adjust the light beam direction of the first LED light source 6 so that the light spot displacement drift value E1 is always 0, and the second steering mirror 21 generates an angle change to adjust the light beam direction of the second LED light source 9 so that the light spot displacement drift value E2 is always 0.

Step f: when the plane mirror 5 rotates along with yaw angle and pitch angle generated by the measured object, the first linear array CCD 16 outputs a displacement value of light beam light spots generated by the first multi-slit diaphragm 8, a distance from the light spot to the center position of an image sensor is S1. The second linear array CCD 17 outputs a displacement value of light beam light spots generated by the second multi-slit diaphragm 11, and a distance from the light spot to the center position of the image sensor is S2.

Step g: $\alpha$ is solved through calculation according to $S1=f\cdot\tan(2\alpha)$ by using the displacement S1 of the light spot of the first linear array CCD 16, and $\alpha$ is a value of a yaw angle generated by the measured object. $\beta$ is solved according to $S2=f\cdot\tan(2\beta)$ by using the displacement S2 of the light spot of the second linear array CCD 17, and $\beta$ is a value of a pitch angle generated by the measured object.

The present disclosure has an innovation point that the second concave lens 43, the fourth convex lens 44 and the fifth convex lens 45 are added to the collimator objective set 4 to form a new collimator objective set 4. The new collimator objective set has many optimization parameters, the influence of the optical system aberration of the device on the measuring results can be reduced, and the system error of the whole device is reduced.

Example 4

The present example is an example of a high-stability nano-radian-order angle measuring device based on drift value feedback.

Figure 8:
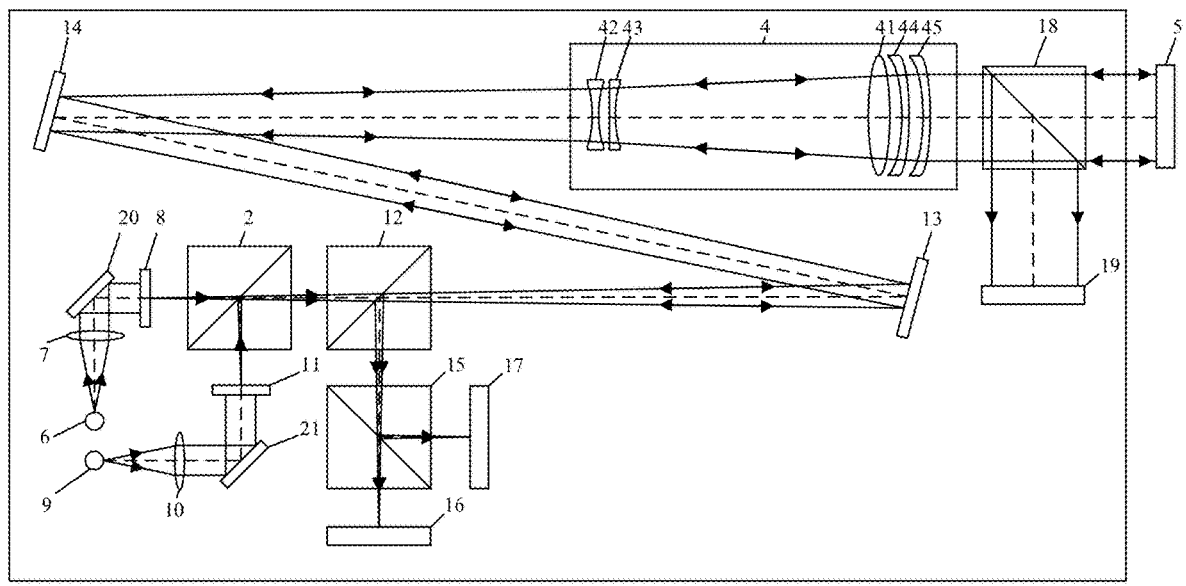
FIG. 8 is a schematic structural diagram of Example 4 of a high-stability nano-radian-order angle measuring device based on drift value feedback of the present disclosure.

A schematic structural diagram of the high-stability nano-radian-order angle measuring device based on drift value feedback of the present example is as shown in FIG. 8. On the basis of Example 1, according to the present example, a fourth beam splitter 18 and a four-quadrant position detector 19 are added between a collimator objective set 4 and a plane mirror 5 to be used as feedback detection module. A first steering mirror 20 is added between a second convex lens 7 and a first multi-slit diaphragm 8, and a second steering mirror 21 is added between a third convex lens 10 and a second multi-slit diaphragm 11 to be used as feedback execution module. In the collimator objective set 4, a second concave lens 43, a fourth convex lens 44 and a fifth convex lens 45 are added, as shown in FIG. 8.

The present example is an example of a high-stability nano-radian-order angle measuring method based on drift value feedback, including the following steps:

Step a: a plane mirror 5 is fixed to a surface of a measured object.

Step b: a first LED light source 6 and a second LED light source 9 are switched on, and positions of the measured object and the plane mirror 5 are adjusted to enable geometric centers of light spot images received by a first linear array CCD 16, a second linear array CCD 17 and a four-quadrant position detector 19 to be located in center positions of each sensor.

Step c: installation directions of a first multi-slit diaphragm 8 and a second multi-slit diaphragm 11 are adjusted so that directions of the light spot images received by the first linear array CCD 16 and the second linear array CCD 17 are respectively perpendicular to the installation directions of the sensors.

Step d: the first LED light source 6 and the second LED light source 9 are controlled to flicker alternately at a fixed frequency, at this moment, the four-quadrant position detector 19 directly receives two beams of measuring light emitted by the first LED light source 6 and the second LED light source 9. The first linear array CCD 16 and the second linear array CCD 17 respectively and alternately acquire measuring light reflected after being emitted by the first LED light source 6 and the second LED light source 9.

Step e: when the four-quadrant position detector 19 outputs the light spot displacement drift values E1 and E2 of the first LED light source 6 and the second LED light source 9, the first steering mirror 20 generates an angle change to adjust the light beam direction of the first LED light source 6 so that the light spot displacement drift value E1 is always 0, and the second steering mirror 21 generates an angle change to adjust the light beam direction of the second LED light source 9 so that the light spot displacement drift value E2 is always 0.

Step f: when the plane mirror 5 rotates along with yaw angle and pitch angle generated by the measured object, the first linear array CCD 16 outputs a displacement value of light beam light spots generated by the first multi-slit diaphragm 8, a distance from the light spot to the center position of an image sensor is S1. The second linear array CCD 17 outputs a displacement value of light beam light spots generated by the second multi-slit diaphragm 11, and a distance from the light spot to the center position of the image sensor is S2.

Step g: $\alpha$ is solved through calculation according to S1=f·tan(2$\alpha$) by using the displacement S1 of the light spot of the first linear array CCD 16, and $\alpha$ is a value of a yaw angle generated by the measured object. $\beta$ is solved according to S2=f·tan(2$\beta$) by using the displacement S2 of the light spot of the second linear array CCD 17, and $\beta$ is a value of a pitch angle generated by the measured object.

The present disclosure has an innovation point that the fourth beam splitter 18 and the four-quadrant position detector 19 are added between the collimator objective set 4 and the plane mirror 5 to be used as feedback detection module, the drift values of the light beams of the two LED light sources are measured in real time, and at the same time, the light beam drift value caused by optical system instability is also measured in real time. The reflector mirrors are in closed loop control to perform real-time compensation on the light source drift values, so that the problem of measurement instability caused by light source drift values and optical system instability is solved.

What is claimed is:

1. A high-stability nano-radian-order angle measuring device based on drift value feedback, comprising a first beam splitter, a collimator objective set, a plane mirror, a first LED light source, a second convex lens, a first multi-slit diaphragm, a second LED light source, a third convex lens, a second multi-slit diaphragm, a second beam splitter, a first deflecting mirror, a second deflecting mirror, a third beam splitter, a first linear array CCD, a second linear array CCD, a fourth beam splitter and a four-quadrant position detector, wherein the collimator objective set consists of a first convex lens and a first concave lens; light emitted by the first LED light source and the second LED light source is collimated by the second convex lens and the third convex lens, respectively, and is then incident in parallel to the first multi-slit diaphragm and the second multi-slit diaphragm; by taking the first multi-slit diaphragm and the second multi-slit diaphragm as object planes, two emitted light beams are gathered through the first beam splitter and are then split through the fourth beam splitter to be split into reflected light and transmitted light; the reflected light is perpendicularly incident upon the four-quadrant position detector; the transmitted light is reflected by the first deflecting mirror and the second deflecting mirror and is then perpendicularly incident upon the collimator objective set to be collimated into parallel light beams; the parallel light beams reflected by the plane mirror all return along their respective original paths, and are split by the third beam splitter after being reflected by the second beam splitter, one path is incident upon the first linear array CCD to be acquired for imaging, and one path is incident upon the second linear array CCD to be acquired for imaging;

the first multi-slit diaphragm consists of three parallel linear slits with equidistance and equal width, the light emitted by the first LED light source is irradiated on the first multi-slit diaphragm after being collimated by the second convex lens, and a light beam emitted by the first LED light source is a first beam of measuring light of the device; the second multi-slit diaphragm has the same structure as the first multi-slit diaphragm, but slit directions of the second multi-slit diaphragm and the first multi-slit diaphragm are perpendicular to each other, and a light beam emitted from the second multi-slit diaphragm is a second beam of measuring light of the device; or the first multi-slit diaphragm consists of four parallel linear slits with equidistance and equal width, the light emitted by the first LED light source is irradiated on the first multi-slit diaphragm after being collimated by the second convex lens, and a light beam emitted by the first LED light source is a first beam of measuring light of the device; the second multi-slit diaphragm has the same structure as the first multi-slit diaphragm, but slit directions of the second multi-slit diaphragm and the first multi-slit diaphragm are perpendicular to each other, and a light beam emitted from the second multi-slit diaphragm is a second beam of measuring light of the device;

the first linear array CCD acquires the first beam of measuring light for imaging, a measuring direction of a sensor and the slit direction of the first multi-slit diaphragm are perpendicular to each other; the second linear array CCD acquires the second beam of measuring light for imaging, and a measuring direction of a sensor and the slit direction of the second multi-slit diaphragm are perpendicular to each other; and the first linear array CCD and the second linear array CCD are disposed at a focal plane of the collimator objective set, and are conjugate with the first multi-slit diaphragm and the second multi-slit diaphragm in positions;

after the four-quadrant position detector is disposed at the fourth beam splitter, a real-time drift value of the first beam of measuring light and the second beam of measuring light is acquired; and the first deflecting mirror and the second deflecting mirror are placed parallel to each other.

2. The high-stability nano-radian-order angle measuring device based on drift value feedback according to claim 1, further comprising a first steering mirror and a second steering mirror;

the first steering mirror is placed between the second convex lens and the first multi-slit diaphragm, the second steering mirror is placed between the third convex lens and the second multi-slit diaphragm, and the first steering mirror and the second steering mirror are configured to finely adjust incidence directions of the first LED light source and the second LED light source, respectively.

3. The high-stability nano-radian-order angle measuring device based on drift value feedback according to claim 1, further comprising a first steering mirror, a second steering mirror, a second concave lens, a fourth convex lens and a fifth convex lens;

the first steering mirror is placed between the second convex lens and the first multi-slit diaphragm, the second steering mirror is placed between the third convex lens and the second multi-slit diaphragm, and the first steering mirror and the second steering mirror are configured to finely adjust incidence directions of the first LED light source and the second LED light source, respectively; and the second concave lens, the fourth convex lens, the fifth convex lens, the first convex lens and the first concave lens jointly form the collimator objective set.

4. The high-stability nano-radian-order angle measuring device based on drift value feedback according to claim 1, further comprising a first steering mirror, a second steering mirror, a second concave lens, a fourth convex lens and a fifth convex lens;

the first steering mirror is placed between the second convex lens and the first multi-slit diaphragm, the second steering mirror is placed between the third convex lens and the second multi-slit diaphragm, and the first steering mirror and the second steering mirror are configured to finely adjust incidence directions of the first LED light source and the second LED light source, respectively;

the second concave lens, the fourth convex lens, the fifth convex lens, the first convex lens and the first concave lens jointly form the collimator objective set; and the fourth beam splitter is placed between the collimator objective set and the plane mirror; two beams of measuring light emitted from the first multi-slit diaphragm and the second multi-slit diaphragm are separately split by the fourth beam splitter, reflected light beams are reflected by the fourth beam splitter to the four-quadrant position detector to be acquired for imaging, and transmitted light beams are transmitted through the fourth beam splitter to continuously propagate.

5. A method of using the high-stability nano-radian-order angle measuring device based on drift value feedback according to claim 1, comprising the following steps:

step a: fixing the plane mirror to a surface of a measured object;

step b: switching on the first LED light source and the second LED light source, and adjusting positions of the measured object and the plane mirror to enable geometric centers of light spot images received by the first linear array CCD and the second linear array CCD to be located in center positions of two sensors;

step c: adjusting installation directions of the first multi-slit diaphragm and the second multi-slit diaphragm so that directions of the light spot images received by the first linear array CCD and the second linear array CCD are perpendicular to the installation directions of the sensors, respectively;

step d: controlling the first LED light source and the second LED light source to flicker alternately at a fixed frequency, at this moment, directly receiving, by the four-quadrant position detector, two beams of measuring light emitted by the first LED light source and the second LED light source, and alternately acquiring, by the first linear array CCD and the second linear array CCD, measuring light emitted by the first LED light source and the second LED light source, respectively;

step e: when the plane mirror rotates along with yaw angle and pitch angle generated by the measured object, outputting, by the first linear array CCD, a displacement value of light beam light spots generated by the first multi-slit diaphragm, wherein a distance from the light spot to the center position of an image sensor is S1, outputting, by the second linear array CCD, a displacement value of light beam light spots generated by the second multi-slit diaphragm, wherein a distance from the light spot to the center position of the image sensor is S2, and outputting, by the four-quadrant position detector, light spot displacement drift values E1 and E2 of the first LED light source and the second LED light source; and step f: solving $\alpha$ through calculation according to $S1-E1=f\cdot\tan(2\alpha)$ by using the displacement S1 of the light spot of the first linear array CCD and the displacement drift value E1 of the light spot of the four-quadrant position detector, wherein $\alpha$ is a value of a yaw angle generated by the measured object; and solving $\beta$ according to $S2-E2=f\cdot\tan(2\beta)$ by using the displacement S2 of the light spot of the second linear array CCD and the displacement drift value E2 of the light spot of the four-quadrant position detector, wherein $\beta$ is a value of a pitch angle generated by the measured object.

6. A method of using the high-stability nano-radian-order angle measuring device based on drift value feedback according to claim 2, comprising the following steps:

step a: fixing the plane mirror to a surface of a measured object;

step b: switching on the first LED light source and the second LED light source and adjusting positions of the measured object and the plane mirror to enable geometric centers of light spot images received by the first linear array CCD, the second linear array CCD and the four-quadrant position detector to be located in a center position of each sensor;

step c: adjusting installation directions of the first multi-slit diaphragm and the second multi-slit diaphragm so that directions of the light spot images received by the first linear array CCD and the second linear array CCD are perpendicular to the installation directions of the sensors, respectively;

step d: controlling the first LED light source and the second LED light source to flicker alternately at a fixed frequency, at this moment, directly receiving, by the four-quadrant position detector, two beams of measuring light emitted by the first LED light source and the second LED light source, and alternately acquiring, by the first linear array CCD and the second linear array CCD, measuring light reflected after being emitted by the first LED light source and the second LED light source respectively;

step e: when the four-quadrant position detector outputs the light spot displacement drift values E1 and E2 of the first LED light source and the second LED light source, generating, by the first steering mirror, an angle change to adjust the light beam direction of the first LED light source so that the light spot displacement drift value E1 is always 0, and generating, by the second steering mirror, an angle change to adjust the light beam direction of the second LED light source so that the light spot displacement drift value E2 is always 0;

step f: when the plane mirror rotates along with yaw angle and pitch angle generated by the measured object, outputting, by the first linear array CCD, a displacement value of light beam light spots generated by the first multi-slit diaphragm, wherein a displacement from the light spot to the center position of an image sensor is S1, and outputting, by the second linear array CCD, a displacement value of light beam light spots generated by the second multi-slit diaphragm, wherein a displacement from the light spot to the center position of the image sensor is S2;

step g: solving α through calculation according to $S1=f\cdot\tan(2\alpha)$ by using the displacement S1 of the light spot of the first linear array CCD, wherein α is a value of a yaw angle generated by the measured object; and solving β according to $S2=f\cdot\tan(2\alpha)$ by using the displacement S2 of the light spot of the second linear array CCD, wherein β is a value of a pitch angle generated by the measured object.

7. A method of using the high-stability nano-radian-order angle measuring device based on drift value feedback according to claim 3, comprising the following steps:

step a: fixing the plane mirror to a surface of a measured object;

step b: switching on the first LED light source and the second LED light source, and adjusting positions of the measured object and the plane mirror to enable geometric centers of light spot images received by the first linear array CCD, the second linear array CCD and the four-quadrant position detector to be located in a center position of each sensor;

step c: adjusting installation directions of the first multi-slit diaphragm and the second multi-slit diaphragm so that directions of the light spot images received by the first linear array CCD and the second linear array CCD are perpendicular to the installation directions of the sensors, respectively;

step d: controlling the first LED light source and the second LED light source to flicker alternately at a fixed frequency, at this moment, directly receiving, by the four-quadrant position detector, two beams of measuring light emitted by the first LED light source and the second LED light source, and alternately acquiring, by the first linear array CCD and the second linear array CCD, measuring light reflected after being emitted by the first LED light source and the second LED light source, respectively;

step e: when the four-quadrant position detector outputs the light spot displacement drift values E1 and E2 of the first LED light source and the second LED light source, generating, by the first steering mirror, an angle change to adjust the light beam direction of the first LED light source so that the light spot displacement drift value E1 is always 0, and generating, by the second steering mirror, an angle change to adjust the light beam direction of the second LED light source so that the light spot displacement drift value E2 is always 0;

step f: when the plane mirror rotates along with yaw angle and pitch angle generated by the measured object, outputting, by the first linear array CCD, a displacement value of light beam light spots generated by the first multi-slit diaphragm, wherein a displacement from the light spot to the center position of an image sensor is S1, and outputting, by the second linear array CCD, a displacement value of light beam light spots generated by the second multi-slit diaphragm, wherein a displacement from the light spot to the center position of the image sensor is S2;

step g: solving α through calculation according to $S1=f\cdot\tan(2\alpha)$ by using the displacement S1 of the light spot of the first linear array CCD, wherein α is a value of a yaw angle generated by the measured object; and solving β according to $S2=f\cdot\tan(2\beta)$ by using the displacement S2 of the light spot of the second linear array CCD, wherein β is a value of a pitch angle generated by the measured object.

8. A method of using the high-stability nano-radian-order angle measuring device based on drift value feedback according to claim 4, comprising the following steps:

step a: fixing the plane mirror to a surface of a measured object;

step b: switching on the first LED light source and the second LED light source, and adjusting positions of the measured object and the plane mirror to enable geometric centers of light spot images received by the first linear array CCD, the second linear array CCD and the four-quadrant position detector to be located in a center position of each sensor;

step c: adjusting installation directions of the first multi-slit diaphragm and the second multi-slit diaphragm so that directions of the light spot images received by the first linear array CCD and the second linear array CCD are perpendicular to the installation directions of the sensors, respectively;

step d: controlling the first LED light source and the second LED light source to flicker alternately at a fixed frequency, at this moment, directly receiving, by the four-quadrant position detector, two beams of measuring light emitted by the first LED light source and the second LED light source, and alternately acquiring, by the first linear array CCD and the second linear array CCD, measuring light reflected after being emitted by the first LED light source and the second LED light source, respectively;

step e: when the four-quadrant position detector outputs the light spot displacement drift values E1 and E2 of the first LED light source and the second LED light source, generating, by the first steering mirror, an angle change to adjust the light beam direction of the first LED light source so that the light spot displacement drift value E1 is always 0, and generating, by the second steering mirror, an angle change to adjust the light beam direction of the second LED light source so that the light spot displacement drift value E2 is always 0;

step f: when the plane mirror rotates along with yaw angle and pitch angle generated by the measured object, outputting, by the first linear array CCD, a displacement value of light beam light spots generated by the first multi-slit diaphragm, wherein a displacement from the light spot to the center position of an image sensor is S1, and outputting, by the second linear array CCD, a displacement value of light beam light spots generated by the second multi-slit diaphragm, wherein a displacement from the light spot to the center position of the image sensor is S2;

step g: solving $\alpha$ through calculation according to $S1=f\cdot\tan(2\alpha)$ by using the displacement S1 of the light spot of the first linear array CCD, wherein $\alpha$ is a value of a yaw angle generated by the measured object; and solving $\beta$ according to $S2=f\cdot\tan(2\beta)$ by using the displacement S2 of the light spot of the second linear array CCD, wherein $\beta$ is a value of a pitch angle generated by the measured object.

\* \* \* \* \*